(12) United States Patent
Yang et al.

(10) Patent No.: US 7,829,603 B2
(45) Date of Patent: Nov. 9, 2010

(54) STABLE TRIFLUOROSTYRENE CONTAINING COMPOUNDS GRAFTED TO BASE POLYMERS, AND THEIR USE AS POLYMER ELECTROLYTE MEMBRANES

(75) Inventors: Zhen-Yu Yang, Hockessin, DE (US); Mark Gerrit Roelofs, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 922 days.

(21) Appl. No.: 11/547,239

(22) PCT Filed: Jun. 25, 2004

(86) PCT No.: PCT/US2004/020701

§ 371 (c)(1),
(2), (4) Date: Oct. 3, 2006

(87) PCT Pub. No.: WO2005/113621

PCT Pub. Date: Dec. 1, 2005

(65) Prior Publication Data

US 2007/0208092 A1    Sep. 6, 2007

(51) Int. Cl.
*C08J 5/20* (2006.01)
(52) U.S. Cl. ............................. 521/27; 521/28; 521/32; 521/33; 525/276
(58) Field of Classification Search ............... 521/27, 521/28, 32, 33; 525/276
See application file for complete search history.

(56) References Cited

U.S. PATENT DOCUMENTS
4,113,922 A    9/1978    D'Agostino et al.
(Continued)

FOREIGN PATENT DOCUMENTS
CN    1346707 A    *    5/2002
(Continued)

OTHER PUBLICATIONS
Feiring et al., Journal of Fluorine Chemistry, vol. 105, pp. 129-135 (2000).*
(Continued)

*Primary Examiner*—Peter D. Mulcahy
*Assistant Examiner*—Henry Hu

(57) ABSTRACT

A fluorinated ion exchange polymer prepared by grafting at least one grafting monomer on to at least one base polymer, wherein the grafting monomer comprises structure 1a or 1b: wherein Z comprises S, $SO_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms; RF comprises a linear or branched perfluoroalkene group of 1 to 20 carbon atoms, optionally containing oxygen or chlorine; Q is chosen from F, —OM, $NH_2$, —N(M)$SO_2R^2_F$, and C(M)($SO_2R^2_F$)$_2$, wherein M comprises H, an alkali cation, or ammonium; $R^2_F$ groups comprises alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b. These ion exchange polymers are useful in preparing catalyst coated membranes and membrane electrode assemblies used in fuel cells.

12 Claims, 2 Drawing Sheets

U.S. PATENT DOCUMENTS

| | | | |
|---|---|---|---|
| 4,169,023 A | | 9/1979 | Sata et al. |
| 4,384,941 A | | 5/1983 | Okamoto et al. |
| 4,396,727 A | | 8/1983 | Ishigaki et al. |
| 4,481,306 A | | 11/1984 | Markus et al. |
| 5,536,754 A | | 7/1996 | Feiring |
| 6,150,426 A | * | 11/2000 | Curtin et al. .................. 521/28 |
| 6,359,019 B1 | * | 3/2002 | Stone et al. .................. 521/27 |
| 6,607,856 B2 | * | 8/2003 | Suzuki et al. ................. 429/30 |
| 6,723,758 B2 | * | 4/2004 | Stone et al. .................. 521/27 |
| 6,828,386 B2 | * | 12/2004 | MacKinnon ................. 525/276 |
| 7,563,532 B2 | * | 7/2009 | Choudhury et al. ........... 429/33 |
| 2002/0137806 A1 | | 9/2002 | Stone et al. |
| 2006/0135715 A1 | * | 6/2006 | Yang .......................... 526/243 |
| 2006/0264576 A1 | | 11/2006 | Roelofs et al. |
| 2006/0276555 A1 | | 12/2006 | Roelofs et al. |
| 2006/0276556 A1 | | 12/2006 | Roelofs et al. |
| 2008/0032184 A1 | * | 2/2008 | Yang et al. .................... 429/46 |
| 2008/0206624 A1 | * | 8/2008 | Choudhury et al. ........... 429/42 |

FOREIGN PATENT DOCUMENTS

| | | | |
|---|---|---|---|
| CN | 1349962 A | * | 5/2002 |
| WO | WO 01/58576 | | 8/2001 |
| WO | WO-01/58576 A1 | * | 8/2001 |
| WO | WO 03/006515 | | 1/2003 |
| WO | WO 03/018654 | | 3/2003 |
| WO | WO-03/018654 A1 | * | 3/2003 |
| WO | WO 2004/026929 | | 4/2004 |
| WO | 2005/003083 A1 | | 1/2005 |
| WO | WO 2005/049204 A2 | | 6/2005 |
| WO | WO 2005/113491 A1 | | 12/2005 |
| WO | 2006/102671 A1 | | 9/2006 |
| WO | WO 2006/102670 A1 | | 9/2006 |
| WO | WO 2006/102671 A1 | | 9/2006 |
| WO | WO 2006/102672 A1 | | 9/2006 |

OTHER PUBLICATIONS

Y. Sone et. al., New Additives to Improve the First-Cycle Charge-Discharge Performance of a Graphic Anode for Lithium-Ion Cells, Journal of the Electrochemical Society, 2005, 152(10), A1996-A2001.

* cited by examiner

STABLE TRIFLUOROSTYRENE CONTAINING COMPOUNDS GRAFTED TO BASE POLYMERS, AND THEIR USE AS POLYMER ELECTROLYTE MEMBRANES

This invention was made with government support under Contract No. DE-FC04-02AL67606 awarded by the U.S. Department of Energy. The government has certain rights in the invention.

FIELD OF THE INVENTION

The present invention relates to a novel compound grafted to a base polymer, and its use in electrochemical cells as membranes, and more particularly to the use of these grafted polymers in fuel cells.

BACKGROUND OF THE INVENTION

Electrochemical cells, such as fuel cells and lithium-ion batteries are known. Depending on the operating conditions, each type of cell places a particular set of requirements upon the electrolytes used in them. For fuel cells, this is typically dictated by the type of fuel, such as hydrogen or methanol, used to power the cell and the composition of the membrane used to separate the electrodes. Proton-exchange membrane fuel cells, powered by hydrogen as the fuel, could be run at higher operating temperatures than currently employed to take advantage of lower purity feed streams, improved electrode kinetics, better heat transfer from the fuel cell stack to improve its cooling. Waste heat is also employed in a useful fashion. However, if current fuel cells are to be operated at greater than 100° C. then they must be pressurized to maintain adequate hydration of typical proton-exchange membranes to support useful levels of proton conductivity.

There is an ongoing need to discover novel grafted films that improve the performance of the latest generation of electrochemical cells, such as fuel cells and lithium-ion batteries, to develop new membrane materials that will maintain adequate proton conductivity at lower levels of hydration and have sufficient durability for the intended application.

SUMMARY OF THE INVENTION

In a first aspect, the invention provides a fluorinated ion exchange polymer prepared by grafting at least one grafting monomer on to at least one base polymer, wherein the grafting monomer comprises structure 1a or 1b:

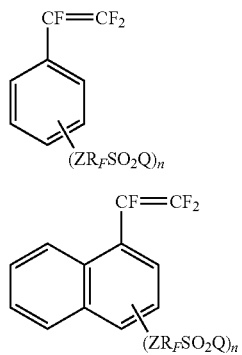

wherein Z comprises S, $SO_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ comprises a linear or branched perfluoroalkene group of 1 to 20 carbon atoms, optionally containing oxygen or chlorine;

Q is chosen from F, —OM, —$NH_2$, —N(M)$SO_2R^2_F$, and —C(M)($SO_2R^2_F$)$_2$, wherein M comprises H, an alkali cation, or ammonium;

$R^2_F$ groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

In the first aspect, the invention also provides the at least one grafting monomer further comprising at least one co-monomer chosen from compounds containing single or multiple vinyl groups, such as divinyl benzene, triallyl cyanurate; at least one monomer having the structure 2 or 3; and mixtures thereof:

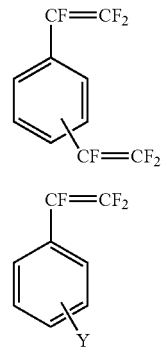

wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms.

In a second aspect, the invention provides a grafting process for making the ionic polymer comprising:

(a) forming a monomer composition comprising at least one grafting monomer, in neat form, emulsion form, or solution form; wherein the grafting monomer comprises structure 1a or 1b:

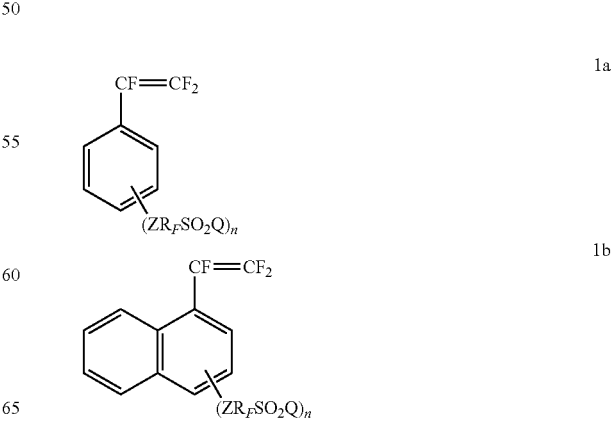

wherein Z comprises S, SO$_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ comprises a linear or branched perfluoroalkene group of 1 to 20 carbon atoms, optionally containing oxygen or chlorine;

Q is chosen from F, —OM, —NH$_2$, —N(M)SO$_2$R$^2_F$, and —C(M)(SO$_2$R$^2_F$)$_2$, wherein M comprises H, an alkali cation, or ammonium;

$R^2_F$ groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

(b) irradiating a base polymer with ionizing radiation; and (c) contacting at least one base polymer with the monomer composition from step (a), at a temperature of about 0° C. to about 120° C. for about 0.1 to about 500 hours. The steps (b) and (c) may be performed simultaneously or sequentially.

In the second aspect, the invention also provides the at least one grafting monomer further comprising at least one co-monomer chosen from compounds containing single or multiple vinyl groups, such as divinyl benzene, triallyl cyanurate; at least one monomer having the structure 2 or 3; and mixtures thereof:

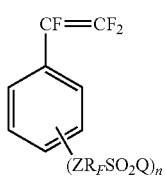

2

3

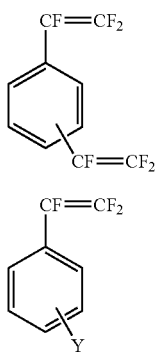

wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms In a third aspect, the invention provides a catalyst coated membrane comprising a polymer electrolyte membrane, wherein the polymer electrolyte membrane comprises a fluorinated ion exchange polymer prepared by grafting at least one grafting monomer on to a base polymer, wherein the grafting monomer comprises structure 1a or 1b:

1a

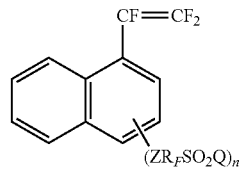

1b wherein Z comprises S, SO$_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ comprises a linear or branched perfluoroalkene group of 1 to 20 carbon atoms, optionally containing oxygen or chlorine;

Q is chosen from F, —OM, —NH$_2$, —N(M)SO$_2$R$^2_F$, and —C(M)(SO$_2$R$^2_F$)$_2$, wherein M comprises H, an alkali cation, or ammonium;

R$^2$F groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

Optionally, the at least one grafting monomer further comprises co-monomer chosen from compounds containing single or multiple vinyl groups, such as divinyl benzene, triallyl cyanurate; at least one monomer having the structure 2 or 3; and mixtures thereof:

2

3

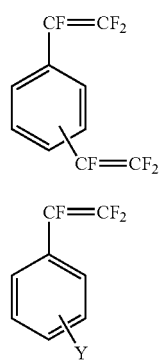

wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms.

In a fourth aspect, the invention provides a membrane electrode assembly comprising a polymer electrolyte membrane, having a first surface and a second surface, wherein the polymer electrolyte membrane comprises a fluorinated ion exchange polymer prepared by grafting at least one grafting monomer on to at least one base polymer film, wherein the grafting monomer comprises structure 1a or 1b:

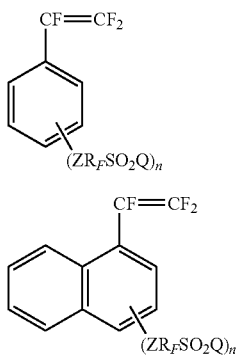

wherein Z comprises S, SO$_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

R$_F$ comprises a linear or branched perfluoroalkene group of 1 to 20 carbon atoms, optionally containing oxygen or chlorine;

Q is chosen from F, —OM, —NH$_2$, —N(M)SO$_2$R$^2_F$, and —C(M)(SO$_2$R$^2_F$)$_2$, wherein M comprises H, an alkali cation, or ammonium;

R$^2_F$ groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

Optionally, the at least one grafting monomer further comprises at least one co-monomer chosen from compounds containing single or multiple vinyl groups, such as divinyl benzene, triallyl cyanurate; at least one monomer having the structure 2 or 3; and mixtures thereof:

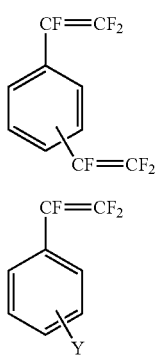

wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms In the fourth aspect, the membrane electrode assembly further comprises at least one electrode prepared from an electrocatalyst coating composition present on the first and second surfaces of the membrane. It also further comprises at least one gas diffusion backing. Alternately, the membrane electrode assembly further comprises at least one gas diffusion electrode present on the first and second surfaces of the membrane, wherein the gas diffusion electrode comprises a gas diffusion backing and an electrode prepared from an electrocatalyst containing composition.

In a fifth aspect, the invention provides an electrochemical cell, such as a fuel cell, comprising a membrane electrode assembly, wherein the membrane electrode assembly comprises a polymer electrolyte membrane, having a first surface and a second surface, wherein the polymer electrolyte membrane comprises a fluorinated ion exchange polymer prepared by grafting at least one grafting monomer on to at least one base polymer, wherein the grafting monomer comprises structure 1a or 1b:

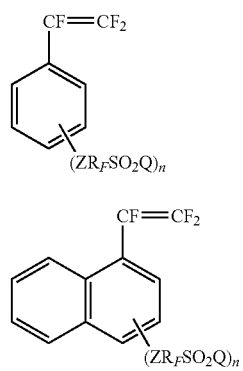

wherein Z comprises S, SO$_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

R$_F$ comprises a linear or branched perfluoroalkene group of 1 to 20 carbon atoms, optionally containing oxygen or chlorine;

Q is chosen from F, —OM, —NH$_2$, —N(M)SO$_2$R$^2_F$, and —C(M)(SO$_2$R$^2_F$)$_2$, wherein M comprises H, an alkali cation, or ammonium;

R$^2_F$ groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

Optionally, the at least one grafting monomer further comprises at least one co-monomer chosen from compounds containing single or multiple vinyl groups, such as divinyl benzene, triallyl cyanurate; at least one monomer having the structure 2 or 3; and mixtures thereof:

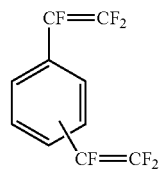

-continued

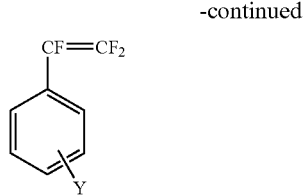
3 wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms In the fifth aspect, the fuel cell further comprises at least one electrode prepared from an electrocatalyst containing composition, e.g., an anode and a cathode, present on the first and second surfaces of the polymer electrolyte membrane. It also further comprises at least one gas diffusion backing. Alternately, the membrane electrode assembly in the fuel cell further comprises at least one gas diffusion electrode present on the first and second surfaces of the membrane, wherein the gas diffusion electrode comprises a gas diffusion backing and an electrode prepared from an electrocatalyst containing composition. In the fifth aspect, the fuel cell further comprises a means for delivering a fuel to the anode, a means for delivering oxygen to the cathode, a means for connecting the anode and cathode to an external electrical load, hydrogen or methanol in the liquid or gaseous state in contact with the anode, and oxygen in contact with the cathode. The fuel is in the liquid or vapor phase. Some suitable fuels include hydrogen; alcohols such as methanol and ethanol; ethers such as diethyl ether, etc.

DETAILED DESCRIPTION OF THE INVENTION

Figure 1:
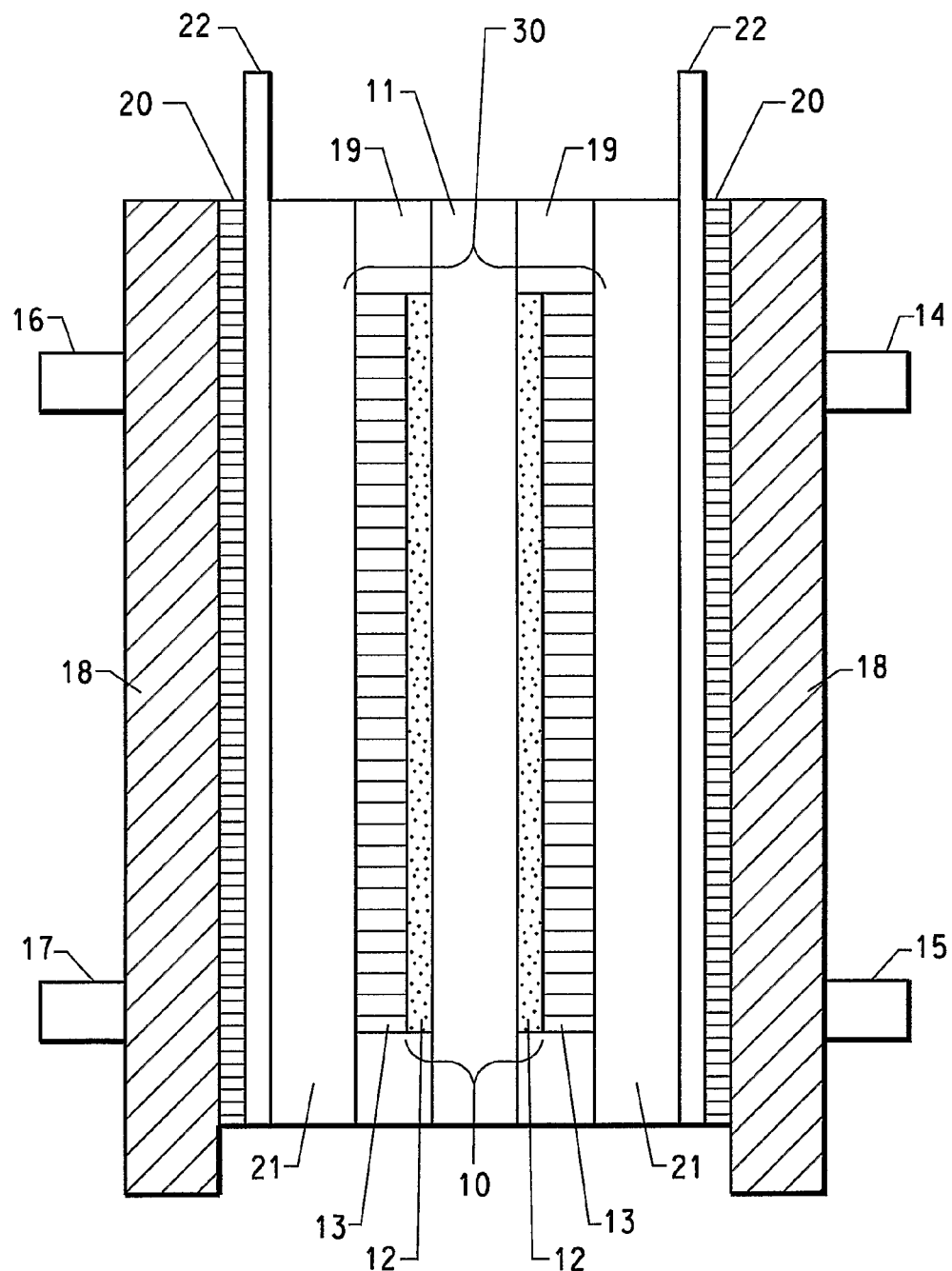
FIG. 1 is a schematic illustration of a single cell assembly.

Fluorinated Ion Exchange Polymer:

The fluorinated ion exchange polymers of the invention are useful as polymer electrolyte membranes in fuel cells, chloralkali cells, batteries, electrolysis cells, ion exchange membranes, sensors, electrochemical capacitors, and modified electrodes.

Fluorinated Monomers:

The fluorinated ion exchange polymer is made by grafting at least one grafting monomer on to a base polymer, wherein the grafting monomer comprises structure 1a or 1b:

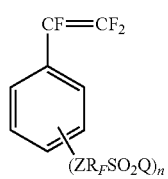
1a

-continued

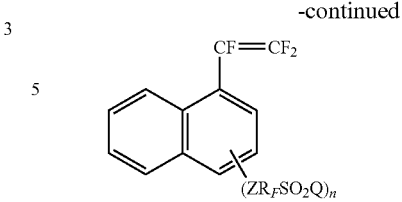
1b wherein Z comprises S, $SO_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ comprises a linear or branched perfluoroalkene group of 1 to 20 carbon atoms, optionally containing oxygen or chlorine;

Q is chosen from F, —OM, —$NH_2$, —N(M)$SO_2R^2_F$, and —C(M)($SO_2R^2_F$)$_2$, wherein M comprises H, an alkali cation, or ammonium;

$R^2_F$ groups comprise alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b. Some suitable perfluorinated alkylene groups $R_F$ may be chosen from $(CF_2)_q$ wherein q 1 to 16, $(CF_2)_qOCF_2CF_2$ wherein q=1 to 12, and $(CF_2CF(CF_3)O)_qCF_2CF_2$ wherein q=1 to 6. Typically $R_F$ comprises $(CF_2)_q$ wherein q=1 to 4; $(CF_2)_qOCF_2CF_2$ wherein q=1 to 4; and $(CF_2CF(CF_3)O)_qCF_2CF_2$ wherein q=1 to 2. $R^2_F$ groups typically are chosen from methyl, ethyl, propyl, butyl, and phenyl, each of which may be partially fluorinated or perfluorinated. More typically $R^2_F$ groups are chosen from perfluoromethyl, perfluoroethyl, and perfluorophenyl. Typically the group Z linking $R_F$ with the trifluorostyrene ring is S (sulfide linkage) or $SO_2$ (sulfone linkage). Typically n is 1.

Typically the monomers having sulfonyl fluoride groups are represented by the structure 1aF or 1bF:

1aF

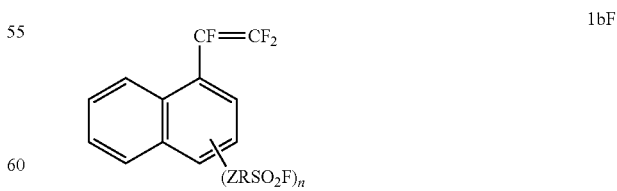
1bF

The sulfonyl fluoride groups may be converted to acid, metal salt, amide, or imide form, either before the grafting reaction or subsequent to the grafting reaction.

Synthesis of grafting monomers

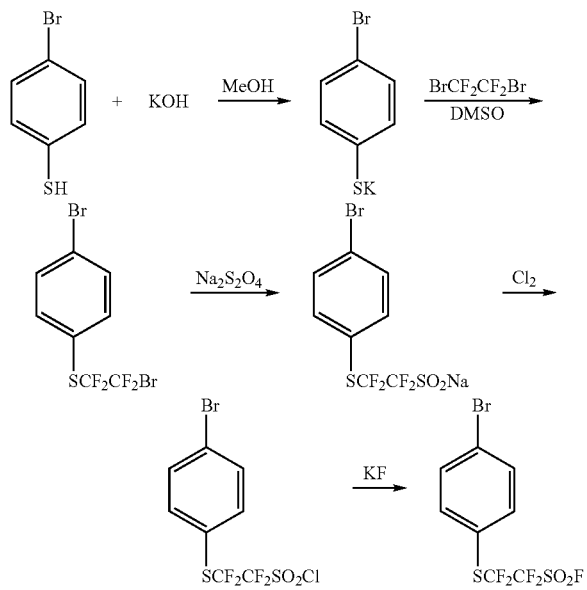

BrC$_6$H$_4$SH was converted into the potassium salt by reacting with KOH in MeOH. After being dried in vacuum, the salt reacted with BrCF$_2$CF$_2$Br in DMSO to give BrC$_6$H$_4$SCF$_2$CF$_2$Br in high yield. Sulfination with Na$_2$S$_2$O$_4$ and then chlorination produced the corresponding fluorosulfonyl chloride, followed by fluorine-chlorine exchange to give the fluorosulfonyl fluoride BrC$_6$H$_4$SCF$_2$CF$_2$SO$_2$F.

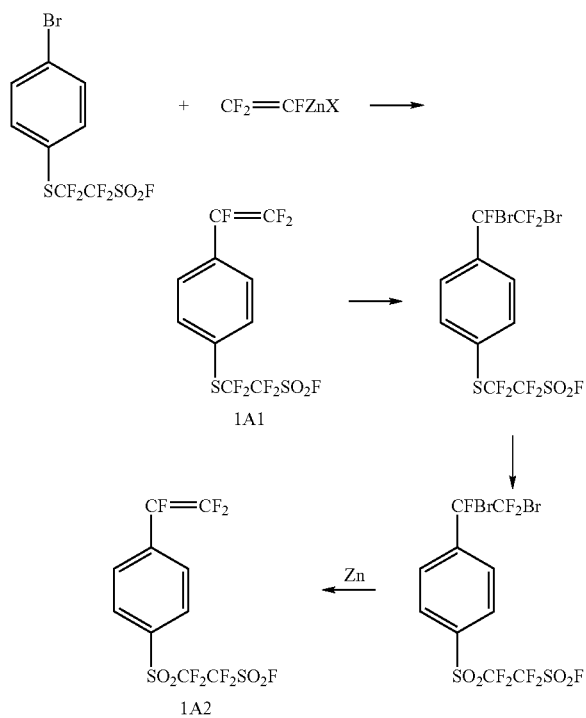

Coupling reaction of BrC$_6$H$_4$SCF$_2$CF$_2$SO$_2$F with CF$_2$=CFZnX with Pd catalysis according to Burton's method (Burton et al, JOC 53, 2714, 1988) gave the coupled product 1a1, which could be protected with Br$_2$ and then oxidized to form the corresponding sulfone. Debromination of the sulfone with Zn gave monomer 1a2.

Other monomers such as trifluorostyrene and 1,4-bis(trifluorostyrene) were made in similar fashion according to Burton's method. Alternatively, the monomers can be prepared by reaction of sodium or potassium salts of bromothiophenol with IR$_F$SO$_2$E, wherein E is a protecting group such as imidazol. The resulting product BrC$_6$H$_4$SR$_F$SO$_2$E undergoes a palladium catalyzed coupling reaction with CF$_2$=CFZnX to give the CF$_2$=CFC$_6$H$_4$SR$_F$SO$_2$E Co-Monomers:

The grafting monomers may optionally include co-monomers to improve the grafting process, or to improve properties such as strength or resistance to solvent swelling. Co-monomers may be introduced along with monomers having structures 1a or 1b during the grafting reaction. The co-monomers must be capable of co-polymerization with monomers 1a or 1b under free-radical conditions. Suitable crosslinking monomers comprise co-monomer chosen from compounds containing single or multiple vinyl groups, such as divinyl benzene, triallyl cyanurate; at least one monomer having the structure 2 or 3; and mixtures thereof:

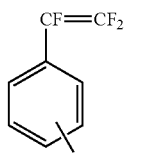

2

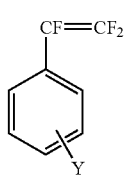

3 wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms. Some suitable substituents Y are chosen from hydrogen, chlorine, fluorine, methyl, ethyl, methoxy, perfluoromethyl, perfluoroethyl, perfluorobutyl, perfluoromethoxy, and —CF$_2$CF(CF$_3$)OCF$_2$CF$_3$.

Base Polymer:

The base polymer to be used as the substrate for the grafting reaction may be a homopolymer or comprised of several comonomers. The base polymer is typically chosen so that it imparts desirable mechanical properties to the final grafted polymer, is stable to the irradiation used to activate the polymer for grafting, and is stable under the conditions to which it is exposed during use. For separators or membranes it is desirable that the base polymer be present in the form of a film, though other shapes may be desired depending on the electrochemical use. Suitable materials may generally include homopolymers or copolymers of non-fluorinated, fluorinated, and perfluorinated monomers. Partially or completely fluorinated polymers often impart increased chemical stability and are more typical. Some typical base polymers may include poly(ethylene-tetrafluorethylene-termonomer (ETFE) that comprises a terpolymer of ethylene and tetrafluoroethylene (TFE), in the range of 35:65 to 65:35 (mole ratios) with from 1 to 10 mole % of a termonomer, perfluorobutyl ethylene in the case of DuPont Tefzel®; ETFE copolymers also using other termonomers (Neoflon® ETFE); ECTFE that comprises a copolymer of ethylene and chlorotrifluoroethylene; FEP that comprises a copolymer of TFE and hexafluoropropylene (HFP), optionally containing a minor amount (1-3 mol %) of perfluoro(alkyl vinyl ether) (PAVE), usually perfluoro(propyl vinyl ether) (PPVE) or perfluoro (ethyl vinyl ether) (PEVE); PFA that comprises a copolymer of TFE and PAVE, wherein PAVE may be PPVE or PEVE; MFA that comprises a copolymer of TFE, PMVE, and PPVE; PTFE that comprises a homopolymer of TFE; modified PTFE, that contains up to 0.5 mol % of another monomer, usually a PAVE; PVF that comprises a polymer of vinyl fluoride (VF); PVDF that comprises a polymer of vinylidene fluoride (VF2); copolymers of VF2 and HFP which are sold under the trademarks KynarFlex® and Viton®. A by Atofina and by DuPont, respectively; polyethylene and polypropylene. The term "modified" distinguishes these polymers from copolymers of TFE. The modified PTFE polymers are, like PTFE, not melt processible.

Typically, the base polymer may be chosen from poly (ethylene-tetrafluoroethylene), poly(ethylene-tetrafluoroethylene-termonomer) (Tefzel®, Neoflon® ETFE); poly(tetrafluoroethylene-hexafluoropropylene) (Teflon® FEP); poly (tetrafluoroethylene-perfluorovinylether) (Teflon® PFA), polytetrafluoroethylene (Teflon® PTFE); poly(ethylene-chlorotrifluoroethylene); poly(vinyledene fluoride) (Kynar® or Solef®); and poly(vinylidenefluoride-hexafluoropropylene) (Kynar® Flex). More typically, the base polymer is chosen from poly(ethylene-tetrafluoroethylene-termonomer), poly(tetrafluoroethylene-hexafluoropropylene), poly (tetrafluoroethylene-perfluoropropylvinylether), and poly (vinyledene fluoride).

Processes for making grafted polymers and membranes:

The fluorinated ion exchange polymer may be prepared by a grafting process comprising the steps of:

(a) forming a monomer composition comprising at least one grafting monomer having structure 1a or 1b, along with optional co-monomers, in neat form, emulsion form, or solution form (b) irradiating a base polymer, typically in film form, with ionizing radiation (c) contacting the base polymer with the monomer composition from step (a), at a temperature of about 0° C. to about 120° C. for about 0.1 to about 500 hours. The steps (b) and (c) may be performed simultaneously or sequentially.

The monomers used in the grafting process are chosen from at least one grafting monomers having structure 1a or 1b, along with optional co-monomers, as described above under Fluorinated Ion Exchange Polymer. Base polymers suitable for the process of the second aspect generally may include homopolymers or copolymers of fluorinated or perfluorinated monomers. Partially or completely fluorinated polymers often impart increased chemical stability and are typical. Typically, the base polymer may be chosen from those listed earlier.

Free radicals may be created in the base polymer in order to produce attachment sites for the grafting monomers using radiation. When the base polymer is in film form, the films are known as irradiated films. The radiation dosage should be sufficient to allow for the desired graft level to be reached, but not so high as to cause excessive radiation damage. Graft level is defined as (wt. of grafted polymer—wt. of base polymer)/ (wt. of base polymer). The radiation may be provided in the form of electron beam, gamma ray, or X-rays. Electron beam irradiation is typically performed at a high dose rate that may be advantageous for commercial production. The irradiation may be done while the base polymer is in contact with the grafting monomers (simultaneous irradiation and grafting). However, if the free radicals of the base polymer are sufficiently stable, then the irradiation may be performed first and in a subsequent step the base polymer may be brought into contact with the grafting monomers (post-irradiation grafting). Base polymers suitable for the post-irradiation grafting method are usually fluorinated polymers. In this case the irradiation may typically be done at sub-ambient temperatures, for example with base polymer cooled with dry ice, and it may be stored at a sufficiently low temperature to prevent decay of the free radicals prior to its use in the grafting reaction.

With some substrates, such as poly(ethylene-tetrafluoroethylene) the irradiation may be performed in the presence of oxygen or in an oxygen-free environment, and an appreciable graft level can be obtained in either case. Typically grafting may be performed in an inert gas, such as nitrogen or argon. This may be accomplished by loading the base polymer films, within an inert-atmosphere box, into oxygen-barrier bags, sealing them shut (with or without grafting monomers and solvent), and then irradiating. In the case of post-irradiation grafting, the base polymer may then also be stored in the oxygen-free environment before and during the grafting reaction.

The grafting reaction may be performed by exposing the base polymer to a monomer composition containing the grafting monomers. In the simplest form, the neat liquid monomers may be used as the monomer composition. It is generally desirable to lower the quantity of fluorinated monomer used in the grafting reaction, and this may be accomplished by diluting it by forming an emulsion or a solution with a solvent, which thus increases the total working volume of the monomer composition. The monomer composition may thus be an emulsion made by mechanical or ultrasonic mixing of the monomers with water and/or alcohols such as isopropanol, and fluorinated or non-fluorinated surfactants such as fluorinated carboxylic salts, typically ammonium perfluorooctanoate and ammonium fluorooctanesulfonate. A third useful form for the monomer composition is a solution of the monomers in an inert organic solvent. Typical solvents include toluene, benzene, halobenzenes, fluorocarbons such as perfluoroethers, fluorochlorocarbons such as 1,1,2-trichlorotrfluoroethane, chlorocarbons such as $CH_2Cl_2$, $CH_2ClCH_2Cl$, and hydrocarbons. The process for making grafted polymers by solvent grafting may also use fluoroalkyl benzene solvents. Preferred fluoroalkyl benzene solvents are trifluoromethylbenzene ($\alpha,\alpha,\alpha$-trifluorotoluene), 1,3-bis(trifluoromethyl)benzene, and 1,4-bis(trifluoromethyl)benzene, and (pentafluoroethyl)benzene, with trifluoromethylbenzene being most preferred. We have found that aromatic compounds substituted with fluorinated aliphatic groups, when used as solvents for the fluorinated vinyl monomers, provide fast rates for grafting monomers to fluorinated base polymers. The grafting solution may comprise mixtures of the grafting monomer(s) and the solvent, where the mole fraction of the solvent in the mixture is between 1% and 99%, more typically between 5% and 90%. Grafting may be accomplished by contacting the base polymer films, during irradiation or subsequent to irradiation, with the monomer composition and holding films at about 0° C. to about 120° C. for about 0.1 to about 500 hours. Typical temperatures are about 25° C. to about 100° C., more typically about 35 to about 90° C., and most typically about 40 to about 80° C. Typical times are about 10 min to about 300 hours, more typically about 1 hour to about 200 hours, and most typically about 1 hour to about 100 hours. Subsequent to the grafting reaction, the solvent and unreacted monomer may be removed by extraction with a low-boiling solvent or through vaporization. The grafted polymer may also be extracted with a solvent in order to remove any polymer formed in the film that is not grafted to the base film.

Preparation of Ionic Polymers:

This invention provides for the facile conversion of the fluorosulfonyl fluorides to acid form, without the use of sulfonation reagents. Polymers grafted with the monomers bearing pendant sulfonyl fluoride groups may be hydrolyzed with bases such as MOH or $M_2CO_3$ (M=Li, Na, K, Cs, $NH_4$) or MOH in MeOH and/or DMSO, and water. The hydrolysis may usually be carried out at room temperature to about 100° C., typically at room temperature to about 80° C. With polymeric substrates such as PVDF that are sensitive to strong base, it is preferable to use the weaker carbonate bases that avoid decomposition of the substrate. Treatment of polymeric salts with acids such as $HNO_3$ gave polymeric acids. It has been found that the particular linkage groups Z used here give rise to increased thermal stability of the ion exchange polymers that are in acid form.

The grafted polymers sulfide (Z=S) may be oxidized to sulfone polymers (Z=$SO_2$) using $CrO_3$ or hydrogen peroxide.

Electrochemical Cell:

As shown in FIG. 1, an electrochemical cell, such as a fuel cell, comprises a catalyst-coated membrane (CCM) (10) in combination with at least one gas diffusion backing (GDB) (13) to form an unconsolidated membrane electrode assembly (MEA). The catalyst-coated membrane (10) comprises a polymer electrolyte membrane (11) discussed above and catalyst layers or electrodes (12) formed from an electrocatalyst coating composition. The fuel cell may be further provided with an inlet (14) for fuel, such as hydrogen; liquid or gaseous alcohols, e.g. methanol and ethanol; or ethers, e.g. diethyl ether, etc., an anode outlet (15), a cathode gas inlet (16), a cathode gas outlet (17), aluminum end blocks (18) tied together with tie rods (not shown), a gasket for sealing (19), an electrically insulating layer (20), graphite current collector blocks with flow fields for gas distribution (21), and gold plated current collectors (22).

Alternately, gas diffusion electrodes comprising a gas diffusion backing having a layer of an electrocatalyst coating composition thereon may be brought into contact with a solid polymer electrolyte membrane to form the MEA.

The electrocatalyst coating compositions used to apply the catalyst layers as electrodes on the CCM (10) or the GDE comprise a combination of catalysts and binders dispersed in suitable solvents for the binders, and may include other materials to improve electrical conductivity, adhesion, and durability. The catalysts may be unsupported or supported, typically on carbon, and may differ in composition depending on their use as anodes or cathodes. The binders may typically consist of the same polymer used to form the polymer electrolyte membrane (11), but may contain in part or be solely composed of other suitable polymer electrolytes as needed to improve the operation of the fuel cell. Some examples include Nafion® perfluorosulfonic acid, sulfonated polyether sulfones, or their membranes.

The fuel cell utilizes a fuel source that may be in the gas or liquid phase, and may comprise hydrogen, an alcohol, or an ether. The fuel is humidified to the degree required to maintain adequate ionic conductivity in the solid polymer electrolyte membrane discussed above so that the fuel cell provides a high power output. Depending on the operating temperature, the fuel cell may be operated at elevated pressures to maintain the required degree of humidification. Typically a gaseous humidified hydrogen feed or methanol/water solution may be supplied to the anode compartment, and air or oxygen supplied to the cathode compartment.

Catalyst Coated Membrane:

A variety of techniques are known for CCM manufacture, which apply an electrocatalyst coating composition similar to that described above onto a solid polymer electrolyte membrane. Some known methods include spraying, painting, patch coating and screen, decal, pad or flexographic printing.

In one embodiment of the invention, the MEA (30), shown in FIG. 1, may be prepared by thermally consolidating the gas diffusion backing (GDB) with a CCM at a temperature of under about 200° C., typically about 140 to about 160° C. The CCM may be made of any type known in the art. In this embodiment, an MEA comprises a solid polymer electrolyte (SPE) membrane with a thin catalyst-binder layer disposed thereon. The catalyst may be supported (typically on carbon) or unsupported. In one method of preparation, a catalyst film is prepared as a decal by spreading the electrocatalyst coating composition on a flat release substrate such as Kapton® polyimide film (available from the DuPont Company). After the coating dries, the decal is transferred to the surface of the SPE membrane by the application of pressure and heat, followed by removal of the release substrate to form a catalyst coated membrane (CCM) with a catalyst layer having a controlled thickness and catalyst distribution. Alternatively, the catalyst layer is applied directly to the membrane, such as by printing, and the catalyst film is then dried at a temperature not greater than about 200° C.

The CCM, thus formed, is then combined with a GDB to form the MEA (30). The MEA is formed, by layering the CCM and the GDB, followed by consolidating the entire structure in a single step by heating to a temperature no greater than about 200° C., typically in the range of about 140 to about 160° C., and applying pressure. Both sides of the MEA can be formed in the same manner and simultaneously. Also, the composition of the catalyst layer and GDB may be different on opposite sides of the membrane.

The invention is illustrated in the following examples.

EXAMPLES

In-Plane Conductivity Measurement

Figure 2:
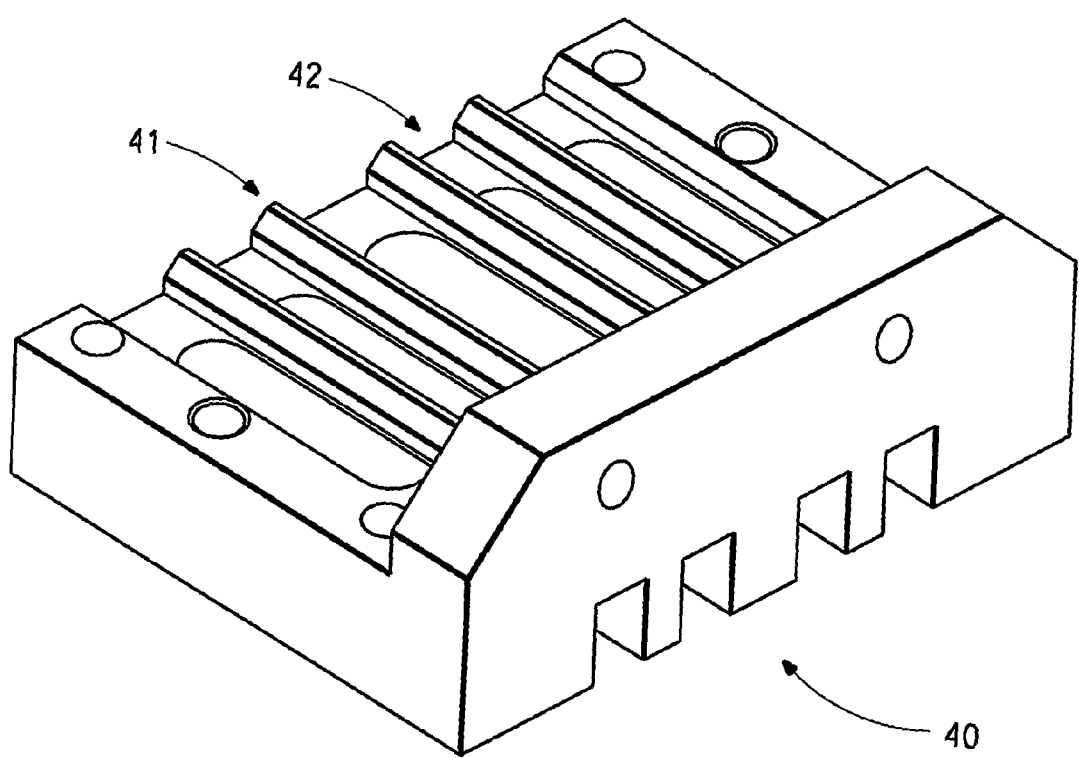
FIG. 2 is a schematic illustration of the lower fixture of a four-electrode cell for in-plane conductivity measurement.

The in-plane conductivity of membranes was measured under conditions of controlled relative humidity and temperature by a technique in which the current flowed parallel to the plane of the membrane. A four-electrode technique was used similar to that described in an article entitled "Proton Conductivity of Nafion® 117 As Measured by a Four-Electrode AC Impedance Method" by Y. Sone et al., J. Electrochem. Soc., 143, 1254 (1996) that is herein incorporated by reference. Referring to FIG. 2, a lower fixture (40) was machined from annealed glass-fiber reinforced Poly Ether Ether Ketone (PEEK) to have four parallel ridges (41) containing grooves that supported and held four 0.25 mm diameter platinum wire electrodes. The distance between the two outer electrodes was 25 mm, while the distance between the two inner electrodes was 10 mm. A strip of membrane was cut to a width between 10 and 15 mm and a length sufficient to cover and extend slightly beyond the outer electrodes, and placed on top of the platinum electrodes. An upper fixture (not shown), which had ridges corresponding in position to those of the bottom fixture, was placed on top and the two fixtures were clamped together so as to push the membrane into contact with the platinum electrodes. The fixture containing the membrane was placed inside a small pressure vessel (pressure filter housing), which was placed inside a forced-convection thermostated oven for heating. The temperature within the vessel was measured by means of a thermocouple. Water was fed from a calibrated Waters 515 HPLC pump (Waters Corporation, Milford, Mass.) and combined with dry air fed from a calibrated mass flow controller (200 sccm maximum) to evaporate the water within a coil of 1.6 mm diameter stainless steel tubing inside the oven. The resulting humidified air was fed into the inlet of the pressure vessel. The total pressure within the vessel (100 to 345 kPa) was adjusted by means of a pressure-control letdown valve on the outlet and measured using a capacitance manometer (Model 280E, Setra Systems, Inc., Boxborough, Mass.). The relative humidity was calculated assuming ideal gas behavior using tables of the vapor pressure of liquid water as a function of temperature, the gas composition from the two flow rates, the vessel temperature, and the total pressure. Referring to FIG. 2, the slots (42) in the lower and upper parts of the fixture allowed access of humidified air to the membrane for rapid equilibration with water vapor. Current was applied between the outer two electrodes while the resultant voltage was measured between the inner two electrodes. The real part of the AC impedance (resistance) between the inner two electrodes, R, was measured at a frequency of 1 kHz using a potentiostat/frequency response analyzer (PC4/750™ with EIS software, Gamry Instruments, Warminster, Pa.). The conductivity, κ, of the membrane was then calculated as κ=1.00 cm/($R \times t \times w$), where t was the thickness of the membrane and w was its width (both in cm).

Example 1

Irradiated Films

ETFE films were obtained in thicknesses of 30 μm and 55 μm (Tefzel® LZ5100 and LZ5200, DuPont Company, Wilmington, Del.). PVdF films were obtained with a thickness 50 μm (Kynar® Goodfellow Corp, Berwyn, Pa.). The films were degassed and brought into a nitrogen-filled glove box. They were cut to size and sealed inside gas-barrier bags (PPD aluminum-foil-barrier bags from Shield Pack, Inc., West Monroe, La.). Dry ice pellets were placed in a metal tray for cooling and the bags with films were placed into the metal tray. The films were irradiated using an electron beam accelerator using 1 MV and a current of 2.2 mA. Up to 6 films were placed in each bag, and the bags were stacked up to 2 high in the tray. The beam was electronically scanned across a 40" aperture while the metal tray was moved slowly beneath the beam at a speed of 2.39 cm/s. Each pass resulted in a dosage of 20 kGy, and from 1 to 13 passes were used resulting in total dosages between 20 and 260 kGy. For dosages above 190 kGy, the passes were broken in to two groups with the inclusion of a three-minute pause between the groups to allow the bags to cool. The irradiated films were stored in the bags under dry ice or in a refrigerator cooled to −40° C.

Example 2

Irradiated films from Example 1 were weighed and placed inside a glass reactor inside a dry box filled with nitrogen. The glass reactor was formed from two concentric glass tubes joined at the bottom to provide a thin annular volume, which was filled with the grafting solution. A de-oxygenated solution of sulfide monomer $CF_2\!=\!CF\!-\!C_6H_4S(CF_2)_2SO_2F$, or sulfone monomer $CF_2\!=\!CF\!-\!C_6H_4S(CF_2)_2SO_2F$, and α,α,α-trifluorotoluene (TFT) (1:1 vol monomer:vol TFT) was poured over the films. The reactor was sealed with a septum and removed from the glove box. It was heated in an oil bath at the temperatures and for the times indicated in Table 1. The films were removed from the monomer solution and rinsed briefly with α,α,α-trifluorotoluene. The films were then heated in tetrahydrofuran (THF) at 70° C. for 4 hours to further remove residual solvent, monomer, and/or polymer that was not bonded to the base film. The films were dried under ambient conditions in a fume hood, reweighed. Graft Levels are indicated in Table 1. Graft Level was calculated as ($w_g$−w)/w, where w is the initial weight of the substrate film and $w_g$ is the weight of the dried grafted film after the THF extraction.

In some cases the films were hydrolyzed by immersion in 10% KOH in $H_2O$:MeOH:DMSO (5:4:1 wt:wt:wt) @ 50° C. for 16 hours. The films were acidified in 14% nitric acid at 50° C. for 1 hour, and then rinsed three times in deionized water at 50° C. for 15 minutes, changing to fresh water each time. Conductivities at 120° C. and 25, 50, or 95% RH are indicated in Table 1.

TABLE 1

| Example | Thickness (um) | Dose (kGy) | Monomer | Solvent | Graft Temp (C.) | Graft Time (hr) | Graft Level (%) | Conductivity 120 C. 25% RH | Conductivity 120 C. 50% RH | Conductivity 120 C. 25% RH |
|---|---|---|---|---|---|---|---|---|---|---|
| 2a | 30 | 200 | sulfide | TFT | 70 | 90 | 74 | 2.1 | 5.7 | 80 |
| 2b | 30 | 140 | sulfide | TFT | 70 | 93 | 27 | | | |
| 2c | 30 | 140 | sulfide | IPA/H2O | 70 | 70 | 40 | | | |
| 2d | 55 | 140 | sulfide | TFT | 70 | 90 | 82 | | | |
| 2e | 30 | 200 | sulfide | TFT | 60 | 93 | 68 | 1 | 2.6 | 45 |
| 2f | 30 | 260 | sulfide | TFT | 60 | 93 | 206 | 14 | 56 | 380 |
| 2g | 30 | 200 | sulfone | TFT | 70 | 90 | 32 | | | |

Example 3

Emulsion Grafting

A 30 mL bottle fitted with a stirring bar was charged with 20 mL of deionized water and 4.0 mL of 20% ammonium perfluorooctanoate (C8) solution. The solution was bubbled with $N_2$ for 10 min., and 3.0 g of $CF_2=CFC_6H_4SCF_2CF_2SO_2F$ were added. The resulting mixture was ultrasonicated for 3 min to give a milky emulsion.

Four films totaling 0.380 g from Example 1 irradiated with 140 kGy dosage were weighed and placed inside 30 mL bottle with a stirring bar inside a dry box filled with nitrogen. The emulsion made above was transferred into the sealed film-containing bottle via a cannula and then the emulsion was stirred at 60° C. for 3 days. The films were removed from the bottle and washed with MeOH, acetone and water. After the grafted films were dried in a vacuum oven at 60° C. with nitrogen bleed for 2 hrs, 1.176 g of grafted films were obtained with a 209.5% graft level. Graft level was calculated as $(w_g-w)/w$, where w is the initial weight of the film and $w_g$ is the weight of the dried washed grafted film.

Example 4

Hydrolysis of Grafted Films

Two grafted films (209% graft level) made in Example 3 were immersed in 10% KOH in $H_2O$:MeOH:DMSO (5:4:1 wt:wt:wt) at 60° C. for 24 hours. The films were acidified in 10% nitric acid at 60° C. for 60 hrs, then rinsed with deionized water to neutral pH. The hydrolyzed film was swollen to 58 μm thickness. The conductivity of the sample was measured in-plane at 80° C. under controlled humidity, varying from 25% first to 95% at the end. The conductivity values are given in the Table 2 below

TABLE 2

| Temperature (° C.) | RH (%) | Conductivity (mS/cm) |
|---|---|---|
| 80 | 25 | 12 |
| 80 | 50 | 52.7 |
| 80 | 95 | 231.7 |

Example 5

Emulsion Grafting

A 30 mL, bottle fitted with a stirring bar was charged with 20 mL of deionized water and 4.0 mL of 20% ammonium perfluorooctanoate (C8) solution. The solution was bubbled with $N_2$ for 10 min. 3.0 g of $CF_2=CFC_6H_4SCF_2CF_2SO_2F$ and 0.3 g of 1,4-di(trifluorovonyl)benzene were added. The resulting mixture was ultrasonicated for 3 min to give a milky emulsion.

Four films from Example 1, each weighing 0.266 g, irradiated with 140 kGy dosage were weighed and placed inside a 30 mL bottle with a stirring bar and placed inside a dry box filled with nitrogen. The emulsion made above was transferred into the sealed film-containing bottle via a cannula and then the emulsion was stirred at 55° C. for 3 days. The films were removed from the bottle and washed with MeOH, acetone and water. After the grafted films were dried in a vacuum oven at 60° C. with nitrogen bleed for 2 hours, 0.366 g of grafted films were obtained. A 37.6% graft level was calculated using the formula: $(w_g-w)/w$, where w is the initial weight of the film and $w_g$ is the weight of the dried grafted film

Example 6

Neat Grafting

Four films from Example 1, each weighing 0.078 g, irradiated with 140 kGy dosage were immersed in neat $CF_2=CFC_6H_4SCF_2CF_2SO_2F$ in a small tube at 60° C. for 3 days. The films were removed from the bottle and washed with MeOH, acetone and water. After the grafted films were dried in a vacuum oven at 60° C. with nitrogen bleed for 2 hrs, 0.134 g of grafted films were obtained. 71.8% Graft level was calculated using the formula: $(w_g-w)/w$, where w is A the initial weight of the film and $w_g$ is the weight of the dried grafted film

Example 7

Hydrolysis and Conductivity

A grafted 1 mil ETFE film having 71.8% weight gain made in Example 6 was immersed in 10 wt % KOH in a solution of $H_2O$:MeOH:DMSO in a ratio of 5:4:1 (wt ratio) in a Petri dish @ 50° C. overnight. The film was rinsed in deionized water for 5 minutes at ambient temperature. The film was ion-exchanged to acid form by dipping in 10% nitric acid at 60° C. for 60 hrs, followed by rinsing in deionized water and then three successive soaks in deionized water for 15 minutes at room temperature. The hydrolyzed film was swollen to 38 μm thickness. The conductivity of the sample was measured in-plane at 80° C. under controlled humidity, varying from 25% first to 95% at the end. The conductivity values are given in the Table 3 below:

TABLE 3

| RH % | Conductivity (mS/cm) |
|---|---|
| 25 | 11.4 |
| 50 | 49.0 |
| 95 | 197.4 |

The thermal stability of the membrane was evaluated using ASTM E1641-99 Standard Test Method for Decomposition Kinetics by Thermogravimetry, with the following exceptions: Air humidified at ambient temperature was used to flow through the sample chamber of a TGA (TA Instruments, New Castle, Del.). The sample was heated to 150° C. and held there for 2 hours during which time much of the water of hydration was lost. The temperature ramps were begun from 150° C., using heating rates of 1, 3, 5, and 10° C./min, and analyzing only the first stage of decomposition. The kinetic TGA study indicated that the calculated time for completion of 10% of the first stage of decomposition at 120° C. was 200 hours.

Example 8

Oxidation of Grafted Membrane

A membrane made in example 4 was immersed in 3.0 g of $CrO_3$ in 50 mL $CH_3CO_2H$ at 60° C. for 24 hrs. The film was removed and washed with water and then immersed in 100 mL of 10% $HNO_3$ at 60° C. for 24 hrs. The clear film was washed with water and immersed in 15% $HNO_3$ again at 60° C. for 24 hrs. The film was washed with water to neutral pH.

The hydrolyzed film was swollen to 38 μm thickness. The conductivity of the sample was measured in-plane at 80° C. under controlled humidity, varying from 25% first to 95% at the end. The conductivity values are given in the Table 4 below.

TABLE 4

| Temperature (° C.) | RH (%) | Conductivity (mS/cm) |
|---|---|---|
| 80 | 25 | 13.2 |
| 80 | 50 | 53.1 |
| 80 | 95 | 347.7 |

The kinetic TGA study using ASTM E1641-99 as modified above indicated that the calculated time for completion of 10% of the first stage of decomposition at 120° C. was $1.4 \times 10^8$ hours.

What is claimed is:

1. A fluorinated ion exchange polymer prepared by grafting at least one grafting monomer on to at least one base polymer, wherein the grafting monomer comprises structure 1a or 1b:

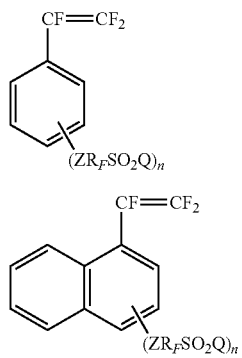

wherein Z is chosen from S, $SO_2$, or POR wherein R comprises a linear or branched perfluoroalkyl group of 1 to 14 carbon atoms optionally containing oxygen or chlorine, an alkyl group of 1 to 8 carbon atoms, an aryl group of 6 to 12 carbon atoms or a substituted aryl group of 6 to 12 carbon atoms;

$R_F$ is chosen from a linear or branched perfluoroalkene group of 1 to 20 carbon atoms, optionally containing oxygen or chlorine;

Q is chosen from F, —OM, —$NH_2$, —N(M)$SO_2R^2_F$, and —C(M)($SO_2R^2_F$)$_2$, wherein M comprises H, an alkali cation, or ammonium;

$R^2_F$ groups is chosen from alkyl of 1 to 14 carbon atoms which may optionally include ether oxygens or aryl of 6 to 12 carbon atoms where the alkyl or aryl groups may be perfluorinated or partially fluorinated; and n is 1 or 2 for 1a, and n is 1, 2, or 3 for 1b.

2. The fluorinated ion exchange polymer of claim 1 wherein Q comprises fluorine.

3. The fluorinated ion exchange polymer of claim 1 wherein $R_F$ is chosen from $(CF_2)_q$ wherein q=1 to 16, $(CF_2)_qOCF_2CF_2$ wherein q=1 to 12, and $(CF_2CF(CF_3)O)_qCF_2CF_2$ wherein q=1 to 6, and $R^2_F$ is chosen from methyl, ethyl, propyl, butyl, and phenyl, each of which may be partially fluorinated or perfluorinated.

4. The fluorinated ion exchange polymer of claim 3 wherein $R_F$ is chosen from $(CF_2)_q$ wherein q=1 to 4; $(CF_2)_qOCF_2CF_2$ wherein q=1 to 4; and $(CF_2CF(CF_3)O)_qCF_2CF_2$ wherein q=1 to 2 and $R^2_F$ is chosen from perfluoromethyl, perfluoroethyl, and perfluorophenyl.

5. The fluorinated ion exchange polymer of claim 3 wherein n=1 and Z is S or $SO_2$.

6. The fluorinated ion exchange polymer of claim 1 wherein the at least one grafting monomer further comprises at least one co-monomer chosen from compounds containing single or multiple vinyl groups; at least one monomer having the structure 2 or 3; and mixtures thereof:

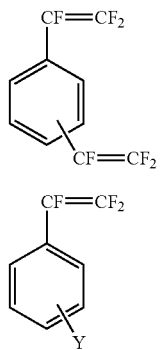

wherein Y comprises H; halogen such as Cl, Br, F or I; linear or branched alkyl or perfluoroalkyl groups, wherein the alkyl group comprises C1 to C10 carbon atoms; or a perfluoroalkyl group containing oxygen, chlorine or bromine, and wherein the alkyl group comprises C1 to C10 carbon atoms.

7. The fluorinated ion exchange polymer of claim 6 wherein the compounds containing single or multiple vinyl groups comprise bis(trifluorovinyl)-benzenes of structure 2 or triallyl cyanurate.

8. The fluorinated ion exchange polymer of claim 7 wherein the substituents Y on co-monomer of structure 3 are chosen from hydrogen, chlorine, fluorine, methyl, ethyl, methoxy, perfluoromethyl, perfluoroethyl, perfluorobutyl, perfluoromethoxy, and —$CF_2CF(CF_3)OCF_2CF_3$.

9. The fluorinated ion exchange polymer of claim 1 wherein the base polymer comprises at least one homopolymer or copolymer prepared from non-fluorinated, fluorinated, or perfluorinated monomers.

10. The fluorinated ion exchange polymer of claim 9 wherein the base polymer is chosen from poly(ethylene-tetrafluoroethylene), poly(ethylene-chlorotrifluoroethylene), poly(tetrafluoroethylene-hexafluoropropylene), poly(tetrafluoroethylene-perfluoroalkyl vinyl ether), poly(tetrafluoroethylene-perfluoromethyl vinyl ether), poly(tetrafluoroethylene-perfluoropropyl vinyl ether), polytetrafluoroethylene, modified polytetrafluoroethylene, polyvinyl fluoride, polyvinylidene fluoride, poly(vinylidene fluoride-hexafluoropropylene), poly(ethylene-tetrafluoroethylene-termonomer), poly(tetrafluoroethylene-perfluorovinylether), polyethylene, and polypropylene.

11. The fluorinated ion exchange polymer of claim 10 wherein the perfluoro(alkyl vinyl ether) comprises a perfluoro(propyl vinyl ether) or perfluoro(ethyl vinyl ether).

12. The fluorinated ion exchange polymer of claim 2 wherein the base polymer is chosen from a terpolymer of ethylene, tetrafluoroethylene (TFE), and 1 to 10 mole % of a termonomer comprising perfluorobutyl ethylene.

* * * * *